R. S. LAWRENCE.
Breech-Loading Fire-Arm.
No. 1,670. Reissued May 17, 1864.
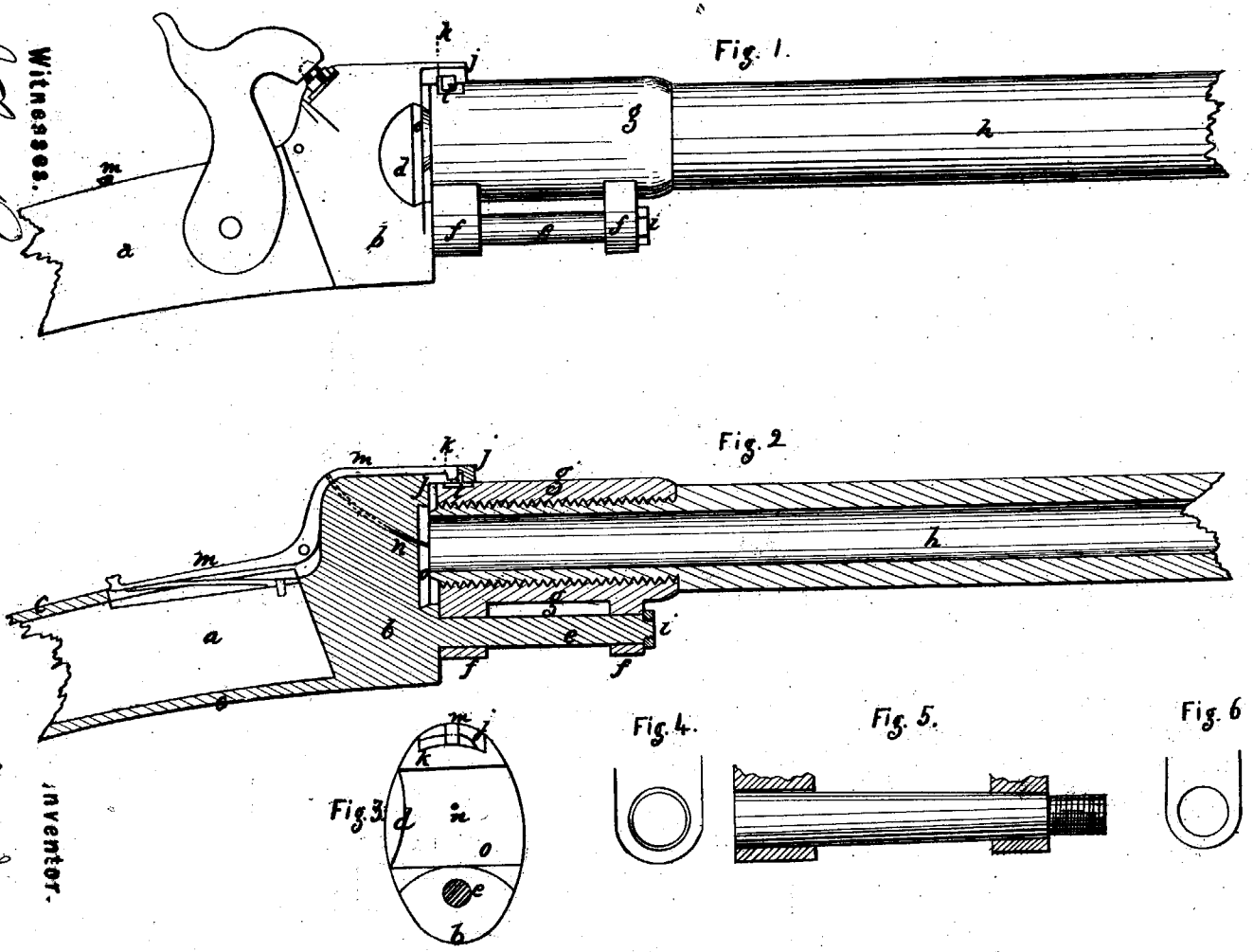
Witnesses.
J. Thomden Bell
John Meigs.
Inventor.
C. H. Schroeff Assignee of R. S. Lawrence by his attorney
B. Adams Jr. Esq.
N. PETERS, PHOTO-LITHOGRAPHER, WASHINGTON, D. C.

UNITED STATES PATENT OFFICE.

E. H. ASHCROFT, OF BOSTON, MASSACHUSETTS, ASSIGNEE OF RICHARD S. LAWRENCE.

IMPROVEMENT IN BREECH-LOADING FIRE-ARMS.

Specification forming part of Letters Patent No. 8,637, dated January 6, 1852; Reissue No. 1,670, dated May 17, 1864.

*To all whom it may concern:*

Be it known that RICHARD S. LAWRENCE, of Windsor, in the county of Windsor and State of Vermont, did invent a new and useful Improvement in Breech-Loading Fire-Arms; and I do hereby declare that the following is a full, clear, and exact description thereof, reference being had to the accompanying drawings, and to the letters of reference marked thereon, in which—

Figure 1 is a side elevation of a gun embracing his improvement. Fig. 2 is a longitudinal vertical section through the center of the same; Fig. 3, a cross-section thereof. Figs. 4, 5, and 6 are sections of the taper spindle and the arms that turn thereon to sustain the barrel.

This invention consists, first, in mounting the barrel on a conical or tapering spindle attached to and projecting from the breech beneath the re-enforce, so that the axis of the spindle shall always be parallel to the barrel; second, in screwing the barrel into a sleeve or re-enforce to which the arms are attached by which the barrel is turned upon the spindle; third, in combining with the barrel a spring catch-lever to hold it in position when loaded, or to release the barrel when it is to be turned aside to receive a cartridge; fourth, in combining with the barrel a cutting-edged breech-piece to cut off the rear end of the cartridge by turning the barrel into position.

In the accompanying drawings, *a* represents the stock of a gun, and *b* a breech-piece of metal secured to the forward end of the stock by two metal straps, *c c*, let into the stock at top and bottom. The front face of this breech-piece is flat and at right angles to the bore of the barrel. The right-hand edge is slightly curved, as represented in the drawings at *d*, and brought to a sharp edge, such as will effectually cut paper. A tapering or conical spindle, *e*, projects from near the bottom of the breech-piece, and to the spindle is fitted, to turn freely but accurately thereon, two arms, *f f*, that project downward from a sleeve, *g*, that embraces and in which is firmly fitted the rear end of the barrel *h*. These arms may be made wider or narrower, or of one piece, so as to cover the spindle, according to the strength required; and the size and taper of the spindle must be adapted to the requirements of the particular arm to which it is applied, for it is obvious that the proportions of a musket must differ from those of a fowling-piece. The sleeve or re-enforce *g* not only serves to strengthen the barrel at the point where it has to encounter the whole expansive force of the cartridge, but gives a secure support for the arms by which it is connected with the spindle on which the barrel turns, as well as a support to hold the barrel firmly to the breech at the top and it is obvious may be extended to any length that the barrel of any breech-loading arm may require such strengthening and support. After these arms have been put on the spindle, they are held in place by a nut, *i*, on the end of the spindle, which should be screwed up so tight as to insure the close contact of the rear end of the barrel with the front face of the breech-piece. The breech-piece is formed with a flange or projecting piece, *j*, at the top, and projecting out in front and extending some distance over the barrel, and in the under face thereof is formed a transverse groove, *k*, which receives a lip, *l*, projecting upward from the sleeve that embraces the barrel, so that when the barrel is in place the fitting of this lip in the groove shall firmly bind together the barrel and breech-piece, to resist the force of the explosions. The barrel is locked in place by a spring catch-lever, *m*, the forward end of which enters a notch in the lip *l*, its rear end having a thumb-piece projecting upward by which the operator can unlock the barrel at pleasure. In the line of the axis of the barrel, or at any point within the bore, when the barrel is in place and locked, there is a hole, *n*, which runs up through the breech-piece to and through the nipple for the purpose of communicating fire to the charge. If the breech-piece is made of iron or other soft metal, then a part of its face should be cut out and filled up with a plate of steel, *o*, to make the cutting-edge. This plate of steel is best secured by being dovetailed into the breech-piece.

It will be seen by the foregoing that by pressing the thumb of the right hand on the catch-lever *m* the barrel can be turned by the left hand until the bore of the barrel is brought outside of the breech-piece, for the reception of a cartridge, which is conveniently and readily inserted by the right hand while the gun is held in the left, and then the barrel is turned back and locked, the cutting-edges at the side of the breech-piece cutting off the rear end of the cartridge, so that the powder of the charge is thus exposed to the touch-hole in the breech-piece. The spring catch-lever drops into its notch the moment the barrel is turned into position, and the barrel is thus firmly held up to the breech-piece both at top and bottom, and can be discharged any number of times with safety.

What is herein claimed as the invention of the said LAWRENCE is—

1. Mounting the barrel on a conical or tapering spindle, to turn it aside and load it at the breech, substantially in the manner described.

2. Screwing the barrel into a sleeve or reenforce whereto the arms on which the barrel turns are attached, to strengthen and support it, substantially in the manner described.

3. The combination of the barrel with the flange *j*, carrying a slot or groove, the lip *l* on the sleeve to fit in the slot, and the spring catch-lever *k*, as and for the purposes set forth.

4. The combination of the barrel with a curved steel cutting-edge breech-piece, as described, so that no loose powder can remain on the outside of the breech after the base of the cartridge has been cut off and the barrel turned into position to fire.

In testimony whereof I have hereunto signed my name this 28th day of April, A. D. 1864.

E. H. ASHCROFT.

Witnesses:
C. E. ASHCROFT,
S. G. MORRILL.